United States Patent [19]

Chang

[11] 3,864,632

[45] Feb. 4, 1975

[54] FAST EQUALIZATION SYSTEM

[75] Inventor: Tien-Lin Chang, Orange, Calif.

[73] Assignee: Rockwell International Corporation, El Segundo, Calif.

[22] Filed: Oct. 1, 1973

[21] Appl. No.: 402,424

[52] U.S. Cl. .................................. 325/42, 333/18

[51] Int. Cl. .......................................... H04b 1/10

[58] Field of Search ............ 325/42, 41, 65; 333/18, 333/28 R; 340;146.1 R/; 235/152

[56] References Cited

UNITED STATES PATENTS

| | | | |
|---|---|---|---|
| 3,581,279 | 5/1971 | Arbuckle | 340/146.1 R |
| 3,582,879 | 6/1971 | Sullivan | 340/146.1 R |
| 3,605,019 | 9/1971 | Cutter et al. | 325/65 |
| 3,614,673 | 10/1971 | Su Kang et al. | 333/18 |
| 3,679,882 | 7/1972 | McAuliffe | 235/152 |

OTHER PUBLICATIONS

Senmoto and Childers, Signal Resolution via Digital Inverse Filtering, IEEE Transactions on Aerospace and Electronics Systems, Vol. AES-8, No. 5, Sept. 1972, pp. 633-640.

*Primary Examiner*—Charles E. Atkinson
*Attorney, Agent, or Firm*—H. Fredrick Hamann; Rolf M. Pitts; George Jameson

[57] ABSTRACT

A discrete frequency domain equalization system is disclosed for utilization in a high-speed synchronous data transmission system where, in a preferred embodiment, samples of an input signal in the time domain are transformed by a discrete fast Fourier transform device into samples in the frequency domain. Reciprocal values of these frequency domain samples are derived from a reciprocal circuit and then transformed by an inverse discrete fast Fourier transform device into time domain samples which are the desired tap gains that are applied to a transversal equalizer in order to minimize the errors in a received signal caused by intersymbol interference and noise.

11 Claims, 16 Drawing Figures

FAST EQUALIZATION SYSTEM

BACKGROUND OF THE INVENTION

1. Field of the Invention

This invention relates to equalization systems for correcting the distortion of digital data sent over a transmission channel, and particularly to a digital impulse response correction system which determines the impulse response of the transmission channel and in response thereto performs a fast equalization in the frequency domain to derive a correction signal which, when combined with the signal being received, permits recovery of the transmitted data in an essentially undistorted form.

2. Description of the Prior Art

Over the years, vast sums of money have been expended in providing telephone transmission equipment which was originally designed for the transmission of information via the spoken word. In recent years, because of the enormous increase in the requirement for transmission of digital data and because of the large investment in industry telephone facilities, it has been necessary to develop systems which will enable data to be sent over these existing voice transmission lines. To accomplish the adaption of telephone lines to digital data transmission, a number of problems have had to be overcome. Variations in gain at different frequencies, i.e., amplitude distortion, and variations in the speed at which different frequencies pass through the line, i.e. delay distortion, as well as variations in these characteristics as lines are switched, cause distortions in the received data waveforms and, although the amplitude and delay distortion does not significantly impair the intelligibility of voice signals transmitted over the line, it does cause smearing of digital signals transmitted on the line and intersymbol interference due to echoes which vary with the line. The resulting conclusion makes very high-speed data transmission impossible without compensation.

Furthermore, not only does the delay and amplitude distortion increase the sensitivity of the data transmission to noise, but it frequently leads to errors even in the absence of noise. This is especially true when the data rate is increased toward the Nyquist rate (a rate in bits per second numerically equal to twice the available bandwidth in cycles per second). In practice, the Nyquist rate has rarely been approached or exceeded except under idealized laboratory conditions. Therefore, delay and amplitude distortion must be compensated for not only to decrease error rate but to make more efficient use of the channel by transmitting at a higher date rate in a given bandwidth. As a result, various devices and techniques have been utilized to minimize the undesired effects of distortion and intersymbol interference in high-speed synchronous data transmission systems.

In one type of system, if the characteristics of the transmission line are known, equalization can be accomplished by predistorting the signal to be transmitted in a way such that the additional distortion by the transmission line alters the predistorted signal to produce a received signal having the desired waveshape. However, use of this technique is limited to those situations where the wave characteristics of the line are constant and known.

Another current practice in the telephone industry is to add attenuation and phase equalization networks to the telephone line and manually adjust these to correct for amplitude and delay distortion. However, adjustments are tedious and specially trained personnel, as well as expensive test equipment, are required for making them. New adjustments are required for every new line, and the equipment cannot adapt itself to changes in the transmission characteristics of the line.

In a typical situation, the impulse response characteristics of the transmission line in use are not only unknown but, moreover, change with time. Prior art transmission systems designed to compensate for such unknown characteristics include the use of equalization networks at the receiving end. These networks function to insert additional delay into the transmission path at those frequencies which experience minimum delay over the transmission line itself. That is, the signal components which are received first are delayed by the equalization network for a time corresponding to the delay time of the remainder of the frequencies transmitted by the line. Such equalization systems, while widely used, suffer the considerable disadvantage that they must be adjusted each time a change in line delay characteristics occurs. The adjustments are tedious, time consuming, and normally must be performed manually.

Another technique to correct for delay distortion on a transmission line involves the use of transversal equalizers or transversal filters. A transversal equalizer comprises a tapped delay line and a plurality of multipliers, each associated with a single tap of the delay line. Each of the multipliers adjusts the amplitude and polarity of the signal obtained from the delay line at its associated tap. The outputs of these multipliers are then summed to provide the transversal equalizer output. By appropriate selection of the tap intervals and the multiplication factors, or tap gains, associated with each of the taps, the transversal equalizer may be used to accomplish intersymbol interference cancellation. That is, by selecting the amplitude characteristics of the multipliers to correspond to the impulse response characteristics of the transmission line, the transversal equalizer effectively eliminates the ring-out associated with a digital pulse transmitted over the line.

Many transversal equalizer systems have been devised to adjust automatically or adaptively the tap gains of the transversal equalizer such that some performance criterion is satisfied. Some examples of such transversal equalizer systems may be found in U.S. Pat. No's. 3,368,168; 3,414,819; 3,414,845; 3,573,624; 3,614,623; 3,638,122; 3,651,316; 3,679,882; 3,694,752; 3,704,826; 3,727,153; and 3,736,414. Most of these systems involve iterative methods, such as various gradient methods. Gradient methods of equalization are usually relatively slow since each may start at some bad initial point. These iterative gradient methods may be applied in the time domain, as described in the article "Automatic Equalization for Digital Communication" by R. W. Lucky, B.S. T.J., Vol. 44, pages 547–588, April 1965, and in the article "Adaptive Equalization of Highly Dispersive Channels for Data Transmission" by A. Gersho, B.S. T.J., Vol. 48, pages 55–70, January 1969. These iterative gradient methods may also be applied in the frequency domain, as described in the article "Automatic Equalization Using the Discrete Frequency Domain" by T. Walzman and M. Schwartz, I.E.E.E. Trans. Inform. Theory, Vol. IT-19, pages 59–68, January 1973. A non-iterative method may also be utilized, such as that described in the article "A Technique for Finding Approximate Inverse Systems and Its Application to Equalization" by E. Newhall, S. U. H. Qureshi and C. F. Simone, I.E.E.E. Trans. Comm. Tech., Vol. COM-19, pages 1,116–1,127, December, 1971. In the Newhall, et al., article, a general inverse system is utilized to derive the tap gains. The difference between the iterative and non-iterative methods is that the iterative method uses signal samples both before and after the equalization, while the non-iterative method uses only the signal sample before the equalization. A discussion and comparison of the results from the iterative and non-iterative methods can also be found in the Newhall et al article. In general, a non-iterative method is faster than an iterative method, in the sense that the non-iterative method takes less time (iteration) to obtain the solution. A non-iterative method will provide solutions when they exist, while an iterative method may or may not provide solutions, depending on the choice of an initial starting point.

SUMMARY OF THE INVENTION

Briefly, a novel system is provided for minimizing the intersymbol interference of digital data sent over a transmission channel. This system operates in a non-iterative manner and performs equalization in the frequency domain. In a first embodiment, a sequence of isolated pulses is used as test signals in a computational mode of operation. The time samples of each test pulse through the transmission channel are transformed into samples in the frequency domain by a first discrete fast Fourier transform device. The reciprocals of the frequency samples are found by a reciprocal circuit and then these reciprocals are transformed back to samples in the time domain by a second discrete fast Fourier transform device. These time samples may be directly used as tap gains for a transversal equalizer, or an ensemble average of these time samples may be performed with the averaged samples then being used as tap gains. The completion of the computational mode results in the optimum tap gains for the transversal equalizer to minimize the intersymbol interference in the transmission channel during an operational mode of operation.

It is therefore an object of this invention to provide a novel system for minimizing intersymbol interference in a digital data transmission channel.

Another object of this invention is to provide a discrete frequency domain equalization system for use with high-speed synchronous data transmission.

Another object of this invention is to provide a fast equalization system in which all tap gains are obtained in one iteration.

Another object of this invention is to provide a fast equalization system which can be used in conjunction with other adaptive systems. A further object of this invention is to provide a discrete frequency domain equalization system which is independent of timing and phase, as long as $h(nT)$ is given.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Figure 1:
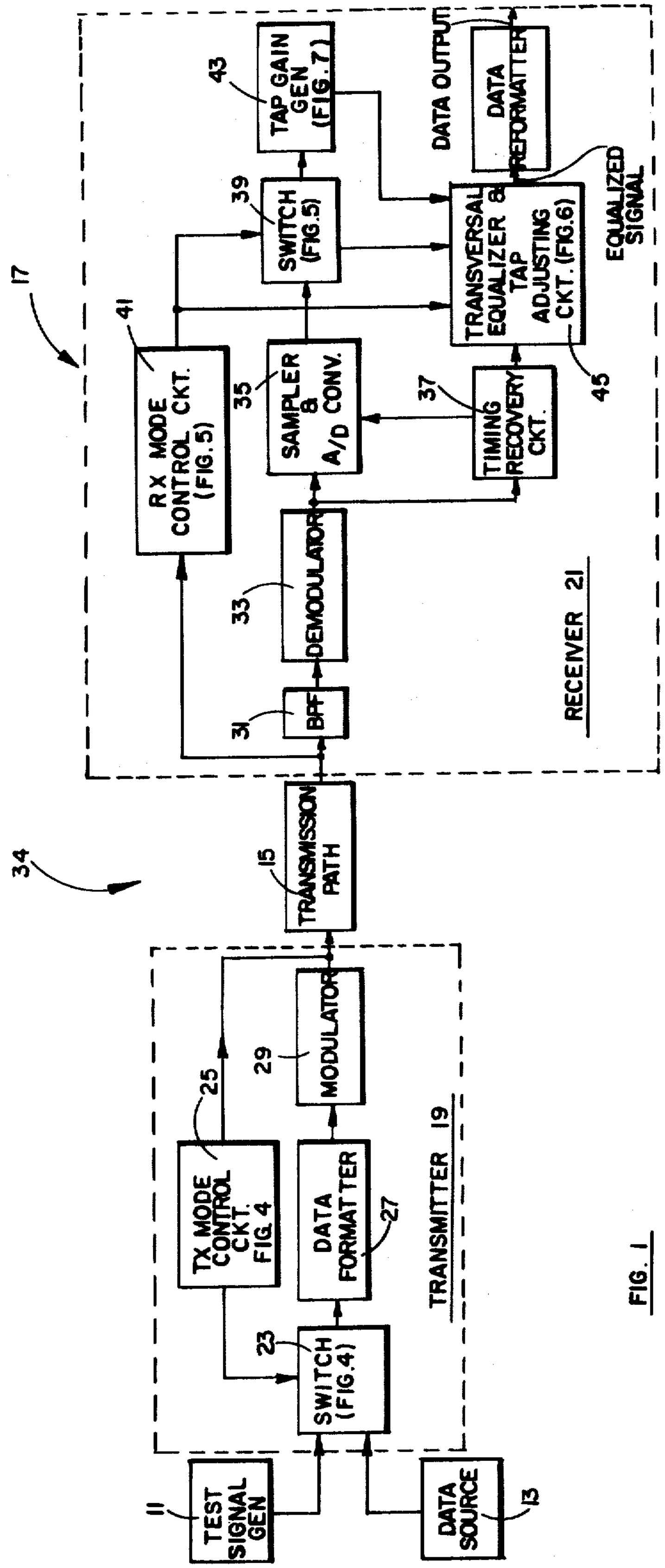
FIG. 1 is a simplified block diagram of a typical data transmission channel which incorporates a first embodiment of the invention.

Referring now to the drawings, FIG. 1 discloses a block diagram of a typical transmission channel system which incorporates the invention. In this overall system it is desired to transmit signal information from either a test signal generator 11 or a data source 13 through a transmission path 15 to some remote location 17. When the transmission path 15 is a standard voice bandwidth telephone line, modulating and demodulating circuits must be included since a telephone line is normally incapable of passing direct current information signals. In FIG. 1 a transmitter 19 is utilized to perform the modulation requirement, while a receiver 21 is utilized to perform the demodulation requirement at the remote location 17.

The transmitter 19 includes a switch 23, which is controlled in operation by a transmitter TX mode control circuit 25, for selecting the signal information from the test signal generator 11 or the data source 13, a data formatter 27 for placing the signal information from the switch 23 in a suitable data format, and a modulator 29 for developing an audiofrequency output which is modulated in amplitude, frequency or phase by the data from the data formatter 27. In a first mode of operation, the TX mode control circuit 25 allows the switch 23 to pass the output of the test signal generator 11 to the data formatter 27 while in a second mode of operation the control circuit 25 allows the switch 23 to pass the output of the data source 13 to the data formatter 27. The control circuit 25 also generates one of two pilot tones to indicate the mode of operation being utilized. The modulated output of the modulator 29 and the pilot tone being generated by the TX mode control circuit 25 are then frequency multiplexed onto a common line and transmitted through the transmission path 15 to the receiver 21 at the remote location 17.

The receiver 21 includes a bandpass filter 31 coupled between the transmission path 15 and a demodulator 33. The filter 31 is a conventional analog-type filter which is designed to have approximately linear phase-frequency characteristics and a flat amplitude-frequency characteristic across the bandpass of the transmission channel 34 comprising the modulator 29, transmission path 15, filter 31 and demodulator 33. This filter 31 is also designed to attenuate noise frequency components outside the passband of the aforesaid transmission channel. The demodulator 33, which can include any suitable demodulating circuit (not shown) and phase-locked loop (not shown) for driving the demodulating circuit, demodulates the data signals at the output of the transmission path 15. The baseband output of the demodulator 33 contains the data developed by the data formatter 27, but in a distorted form due to the overall impulse response characteristic $h_t$ of the aforesaid transmission channel 34. For this reason the receiver 21 also includes a sampler and analog to digital A/D converter circuit 35 which has a sample rate controlled by baud timing pulses from a timing recovery circuit 37 to develop digital samples of the demodulator 33 output, a switch 39 controlled by a mode signal from a receiver RX mode control circuit 41 to apply the digital samples to a tap gain generator 43 during the first mode of operation when the switch 23 in the transmitter 19 is passing the output of the test signal generator 11 to the data formatter 27 and to apply the digital samples to a transversal equalizer and tap adjusting circuit 45 during the second mode of operation when the switch 23 is passing the output of the data source 13 to the data formatter 27, and a data reformatter 47 which, during the second mode of operation, transforms data from the transversal equalizer and tap adjusting circuit 45 back into the format it had at the output of the data source 13. The transversal equalizer and tap adjusting circuit 45 also utilizes the mode signal from the control circuit 41 and a pulse train from a first output of the timing recovery circuit 37 to allow the tap gains from the tap gain generator 43 to internally set the adjustable tap gain settings during the first mode of operation.

The timing recovery circuit 37 contains a stable clock (not shown) and frequency divider chain (not shown) and synchronizes the output of this frequency divider chain with zero-crossings of the received signal. Since these zero crossings contain "time jitter," averaging over several zero-crossings (or the approximate equivalent of such averaging) is used to establish the correct synchronism of the timing recovery output. This type of timing recovery is well known and has been used in data modems such as the Autonetics ADEM modem. A first output of the timing recovery circuit 37 is applied to the transversal equalizer and tap adjusting circuit 45. The first output is a synchronized pulse train at a pulse rate equal to N times the baud rate of transmission where N is the number of stages (or tap-gains) of the circuit 45. A second output of the timing recovery circuit 37 consists of the baud timing pulses which provide the sampling rate for the sampler and A/D converter 35. One baud timing pulse is provided for each baud interval.

Figure 6:
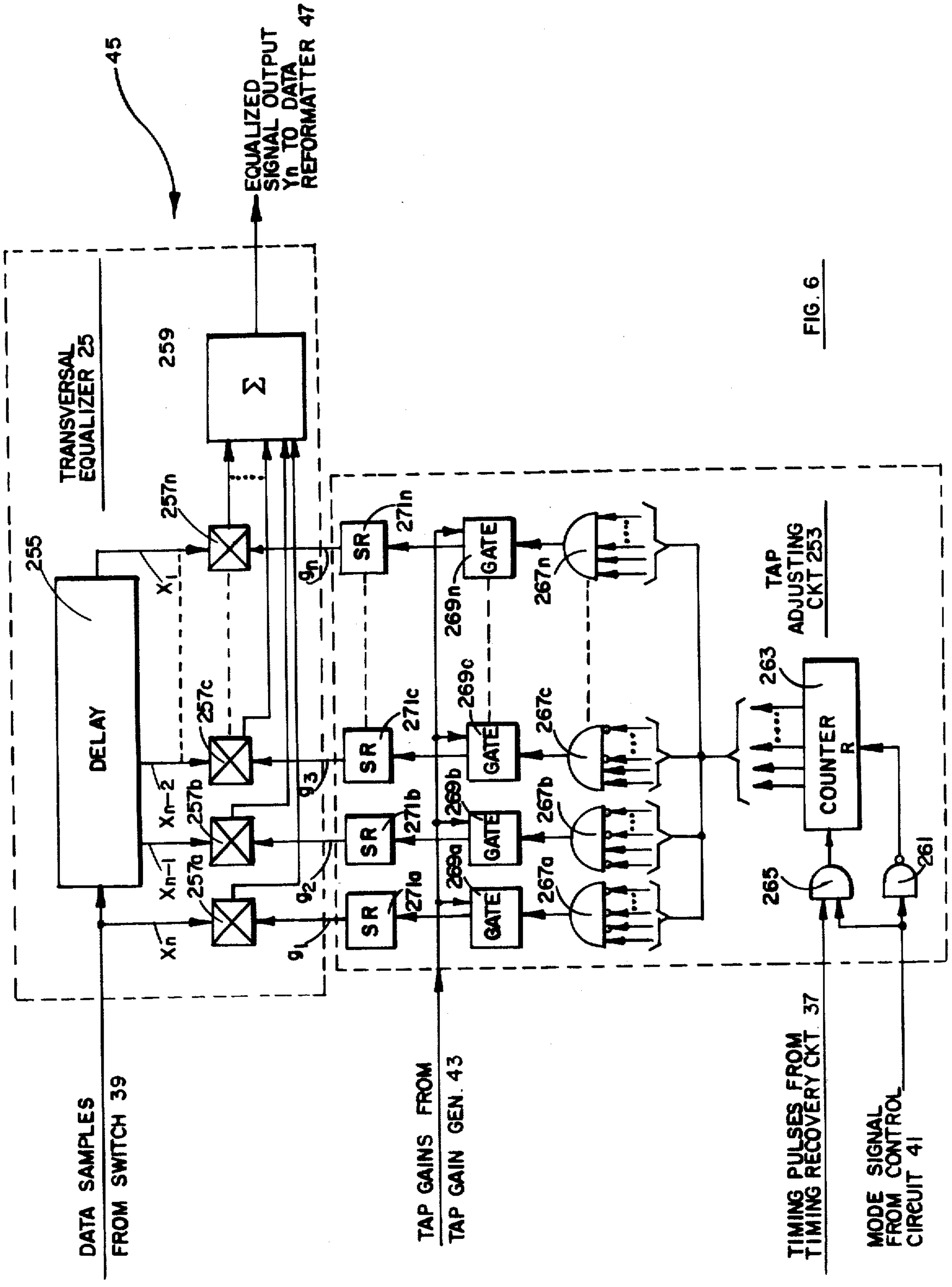
FIG. 6 is a block diagram of a typical transversal equalizer and tap adjusting circuit 45 which may be utilized in FIG. 1.

The switches 23 and 39 may be electronic or mechanical switches and are respectively controlled by the control circuits 25 and 41 to be either in the first or second mode of operation. In the first mode of operation, which is a computational mode, the control circuit 25 controls the switch 23 such that the test signal generator 11 is allowed to apply a sequence of isolated pulses to the data formatter 27. At the same time, the control circuit 25 generates a preselected first pilot tone to indicate that the overall transmission system is in the first mode of operation. This preselected first pilot tone is transmitted through the transmission path 15 and utilized by the control circuit 41 to control the switch 39 such that the digital samples from the sample and A/D converter 35 are automatically utilized by the tap gain generator 43 to develop and apply tap gains to the transversal equalizer and tap adjusting circuit 45. These tap gains are, in turn, automatically utilized by the circuit 45 to electronically or mechanically adjust adjustable tap settings within the circuit 45 to enable the circuit 45 to cancel intersymbol interference during the following second mode of operation, which is an operational mode. One type of transversal equalizer and tap adjusting circuit which is suitable for use in the receiver 21 is described in U.S. Pat. No. 3,727,153. Another type is illustrated in FIG. 6.

In the second mode of operation, the control circuit 25 controls the switch 23 such that the data source 13 is allowed to apply data to the data formatter 27. At the same time the control circuit 25 generates a preselected second pilot tone to indicate that the overall transmission system is in the second mode of operation. This preselected second pilot tone is subsequently utilized by the control circuit 41 during the second mode of operation. This preselected second pilot tone is subsequently utilized by the control circuit 41 during the second mode of operation to control the switch 39 such that digital samples of data from the sampler and A/D converter 35 are equalized in the transversal equalizer and tap adjusting circuit 45 as a function of the previously set tap gain settings in the circuit 45.

Periodically the system can be manually or automatically placed in the first mode of operation for a predetermined period of time in order to derive the tap gains and to adjust the tap gain settings in the circuit 45. At the end of the first mode of operation, the system goes into the remains in the second mode of operation until the next first mode of operation. The duration and frequency of the first mode of operation will depend upon the data communications bit rate, how heavily the transmission channel is being utilized for data communications and how much noise and intersymbol interference is present in the transmission channel 34.

Figure 2A:
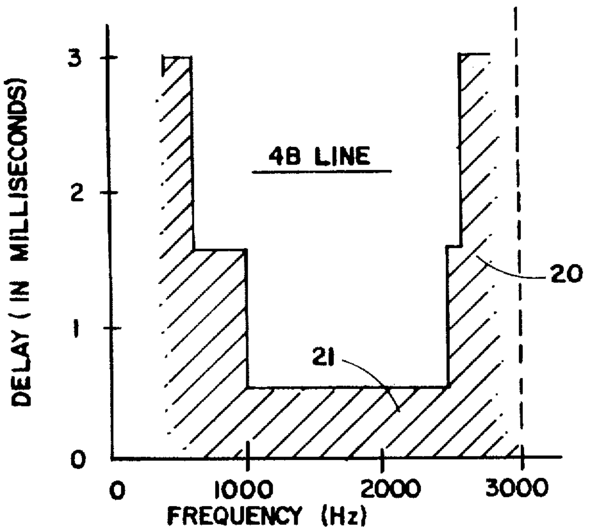
FIGS. 2*a* and 2*b* are waveforms showing typical delay characteristics of two classes of commercial telephone lines.
Figure 2B:
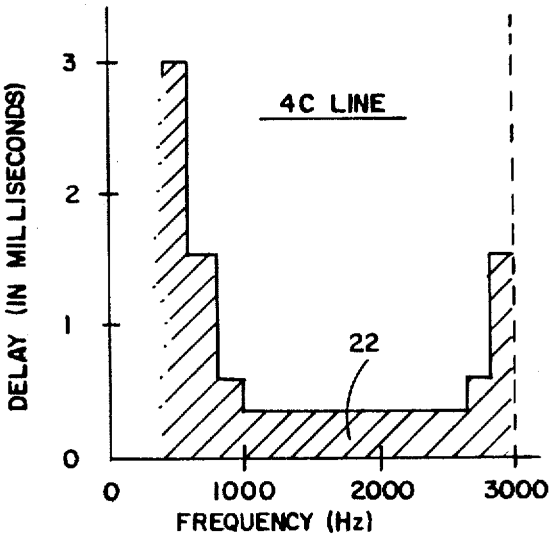

It should be noted at this time that the transversal equalizer and tap adjusting circuit 45 actually equalizes the transmission channel 34 and that it does not directly equalize the transmission path 15. In any given system, the signal distortion characteristics of the modulator 29 and demodulator 33 in the transmission channel 34 may be known and thus readily compensated for. However, the distortion characteristics of the typical transmission path 15 may be unknown and may change with time. when the transmission path 15 includes a telephone line, severe amplitude and delay distortion is introduced into the transmission path. For example, class 4B or 4C commercial telephone transmission lines, which were designed primarily for voice transmission, have delay characteristics shown graphically in FIGS. 2*a* and 2*b*, respectively. such lines may be used to transmit data. As illustrated by shaded regions 20 in FIG. 2*a*, a class 4*b* may exhibit as much as 3 milliseconds delay for signal components below 500 Hz (Hertz) and above 2,800 Hz, while the same class 4B line may have a delay of less than 500 microseconds between 1,000 Hz and 2,600 Hz, as illustrated by shaded region 21. Similarly, as shown in FIG. 2*b*, in FIG. 2*b*, a class 4C line may exhibit a delay of less than 300 microseconds at frequencies between 1,000 Hz and 2,600 Hz, as illustrated by shaded region 22, while exhibiting longer delay times at other frequencies. These delay characteristics result in considerable distortion of a modulated digital signal transmitter over such a telephone line. In fact, it is this delay distortion which in the past has caused most of the difficulty in facilitating high-speed data transmission.

Figures 3A, 3B:
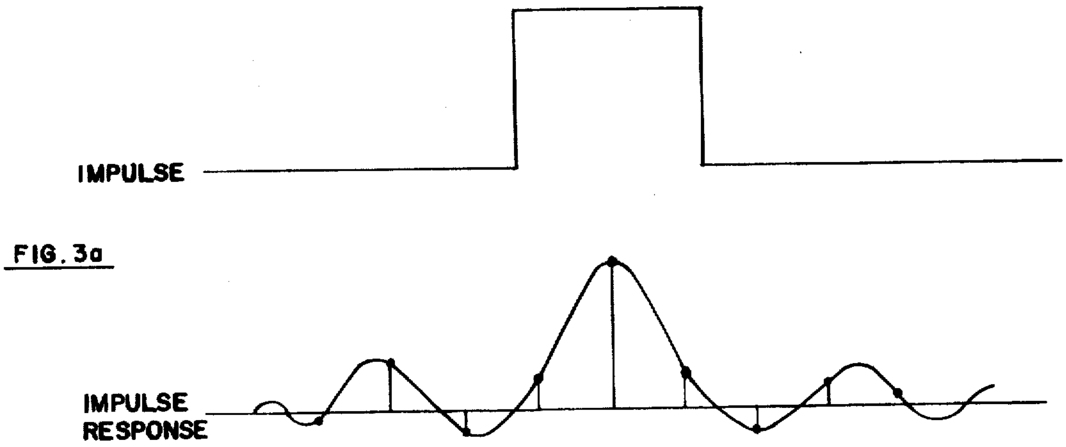
FIGS. 3*a*–3*e* are waveforms useful in explaining the operation of the circuit of FIG. 1.
Figure 3C:
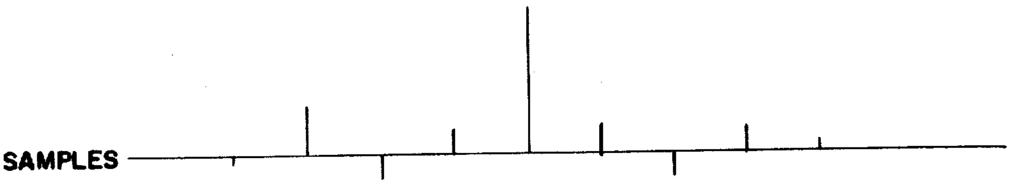
Figure 3D:
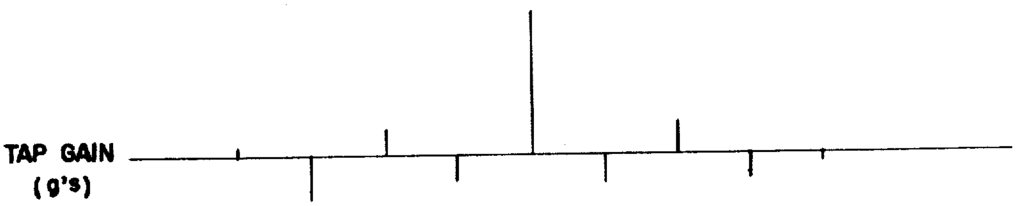
Figure 3E:
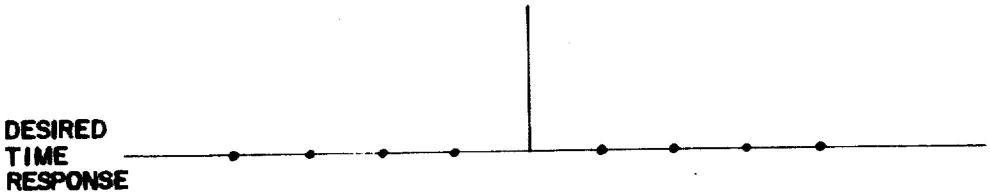

FIGS. 3*a* to 3*e* illustrate typical waveforms which may be found during the operation of the system of FIG. 1. FIG. 3*a* illustrates an impulse to the transmission channel 34, while FIG. 3*b* illustrates the impulse response of that transmission channel. Analog samples of the output of the demodulator 33 (before being digitized) are illustrated in FIG. 3*c*. Analog tap gains, or *g*'s, are shown in FIG. 3*d*. The desired time response to the impulse response is shown in FIG. 3*e*.

Figure 4:
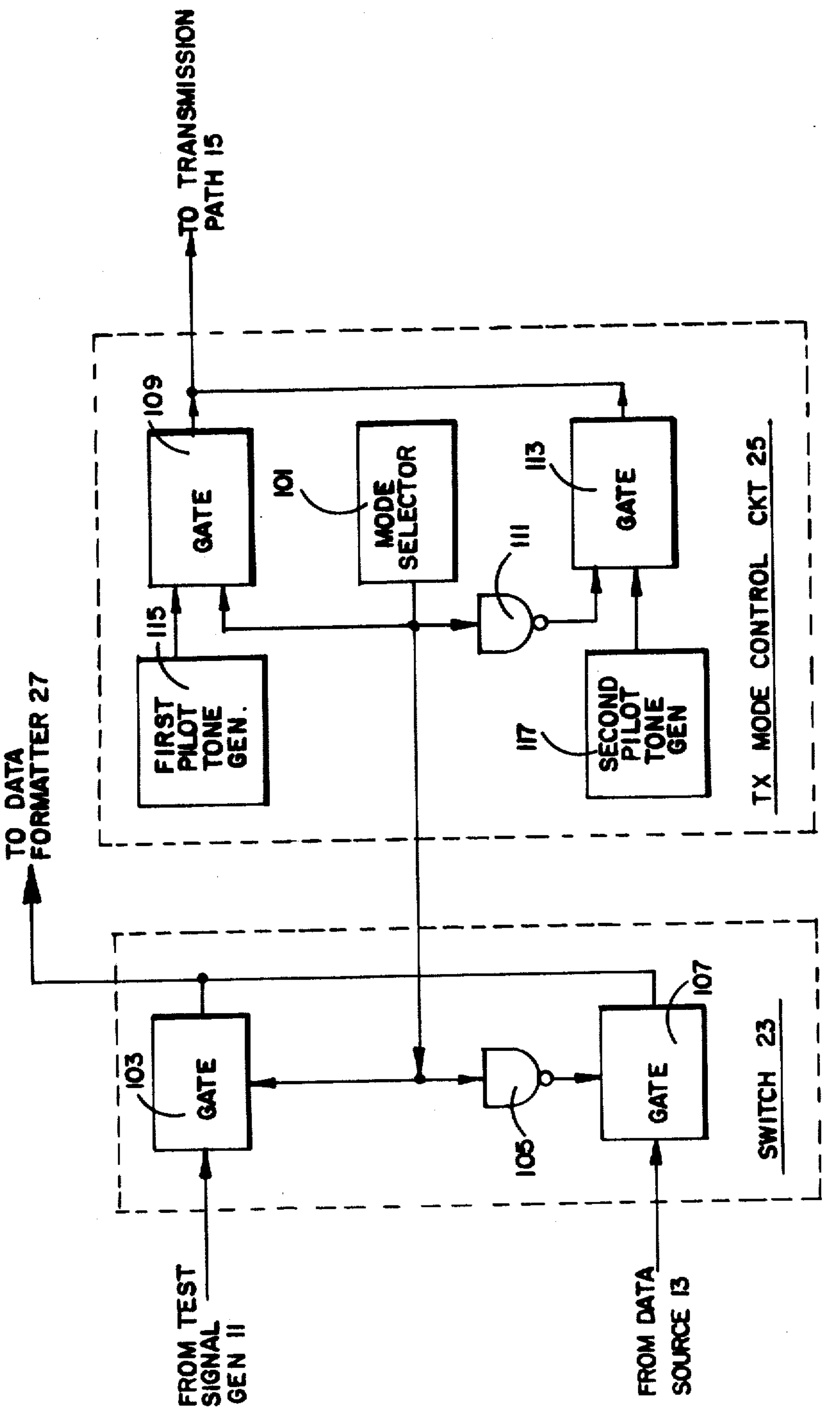
FIG. 4 is a block diagram of the switch 23 and transmitter mode control circuit 25 of FIG. 1.

Referring now to FIG. 4, a block diagram of the switch 23 and transmitter mode control circuit 25 of FIG. 1 is shown. A mode selector 101 is the control circuit 25 is used to control the operation of both the switch 23 and control circuit 25. The mode selector 101 can be, for example, a switch which can be manually or automatically controlled to develop a 1 state binary signal when the first mode of operation is desired and to develop an 0 state binary signal when the second mode of operation is desired.

In the switch 23, the binary signal from the mode selector 101 is directly applied to a gate 103 and is also inverted by a NAND gate 105 and applied to a gate 107. During the first mode of operation the 1 state signal from the mode selector 101 enables the gate 103 to pass the test pulses from the test signal generator 11 to the data formatter 27. At the same time, the inversion of the 1 state signal from the mode selector 101 disables the gate 107 to prevent data from the data source 13 from being passed through the gate 107 to the data formatter 27. In a like manner, during the second mode of operation of 0 state signal from the mode selector 101 disables the gate 103 to prevent test pulses from being applied to the data formatter 27. At the same time, the inversion of the 0 state signal by the NAND gate 105 enables the gate 107 to pass digital information from the data source 13 to the data formatter 27. As a result, the mode selector 101 controls the operation of the switch 23 such that only test pulses from the test signal generator 11 are applied to the data formatter 27 during the first mode of operation, while only data signals from the data source 13 are applied to the data formatter 27 during the second mode of operation.

As stated previously, the mode selector 101 also controls the operation of the TX mode control circuit 25. More specifically, the binary signal from the mode selector 101 is directly applied to a gate 109 and is also inverted by a NAND gate 111 before being applied to a gate 113. During the first mode of operation, the 1 state signal from the mode selector 101 enables the gate 109 to pass a first pilot tone from a first pilot tone generator 115 to the input of the transmission path 15. At the same time, the inversion of the 1 state signal from the mode selector 101 by the NAND gate 111 disables the gate 113. During the second mode of operation, the 0 state signal from the mode selector 101 enables the gate 109 and is also inverted by the NAND gate 111 to enable the gate 113 to pass a second pilot tone from a second pilot tone generator 117 to the input of the transmission path 15. As a result, only the first pilot tone is transmitted through the transmission path 15 during the first mode of operation, and only the second pilot tone is transmitted through the transmission path 15 during the second mode of operation. The frequencies of the first and second pilot tones can be selected to lie outside of the bandpass of the bandpass filter 31 (FIG. 1).

Figure 5:
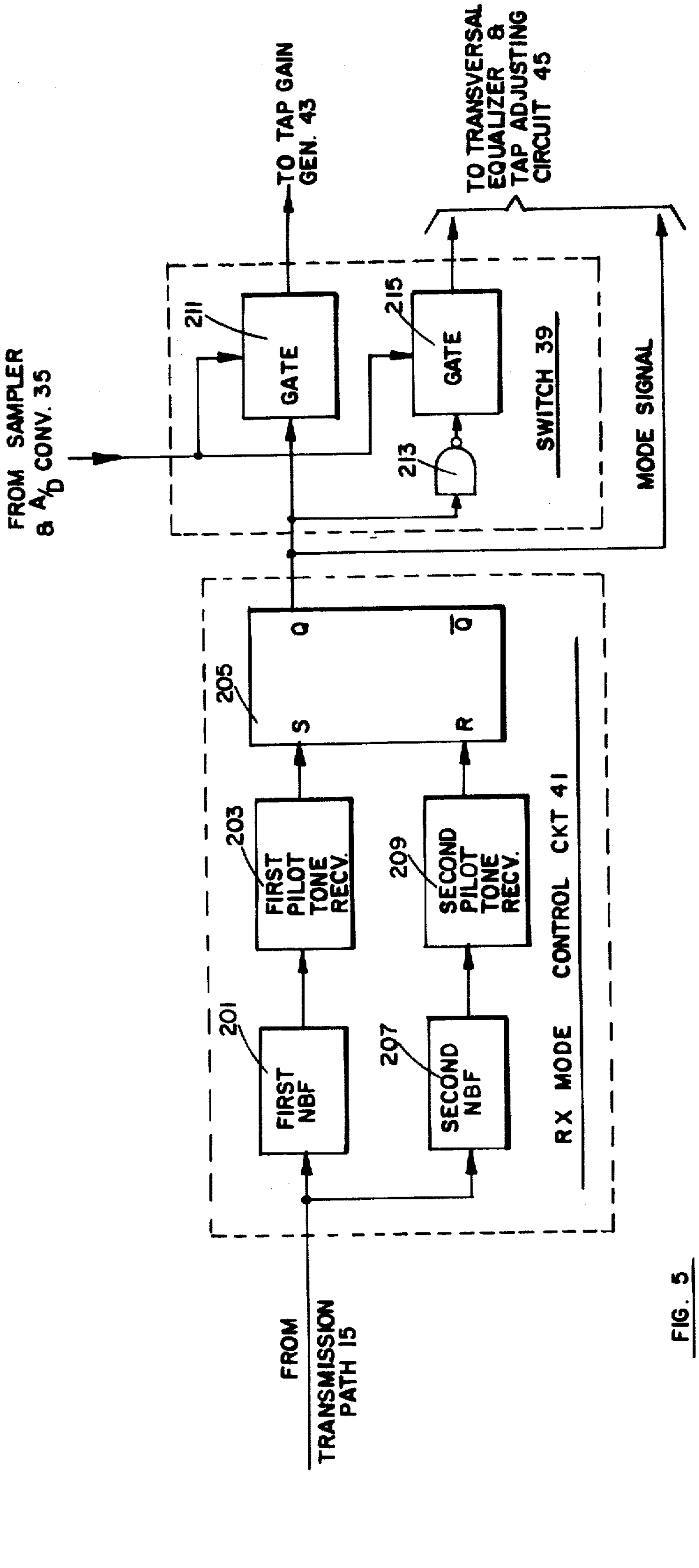
FIG. 5 is a block diagram of the receiver mode control circuit 41 and switch 39 of FIG. 1.

FIG. 5 illustrates in block diagram form the receiver RX mode control circuit 41 and switch 39 in the receiver 21 of FIG. 1. The receiver mode control circuit 41 receives and utilizes whichever pilot tone that is being transmitted through the transmission path 15 at any given time in order to set the mode of operation of the switch 39, and hence of the receiver 21. During the first mode of operation, the first pilot tone is readily passed through a first narrow band filter NBF 201, detected by a first pilot tone receiver 203, and used to set a flip-flop 205 so that its Q output changes to a 1 state signal. Similarly, during the second mode of operation, the second pilot tone is readily passed through a second narrow band filter 207, detected by a second pilot tone receiver 209, and used to reset the flip-flop 205 so that its Q output changes to a 0 state signal. The Q output of the flip-flop 205 is designated as the mode signal since its binary state indicates which mode of operation the system is in. The system is operating in the first mode when the mode signal is in a binary 1 state and in the second mode when the mode signal is in a binary 0 state.

In the switch 39, the mode signal is directly applied to a gate 211 and is also inverted by a NAND gate 213 before it is applied to a gate 215. The digital output of the sampler and A/D converter 35 is also applied to both of the gates 211 and 215. During the first mode of operation, when the mode signal is in a 1 state, the gate 215 is disabled, while the gate 211 is enabled to pass the output of the circuit 35 to the tap gain generator 43. During the second mode of operation, when the mode signal is in a 0 state, the gate 211 is disabled, while the date 215 is enabled by the logical inversion of the 0 state mode signal by the NAND gate 213 to pass the output of the circuit 35 to the transversal equalizer and tap adjusting circuit 45.

One type of transversal equalizer and tap adjusting circuit 45 which is suitable for use in the system of FIG. 1 is illustrated in FIG. 6. The circuit 45 is comprised of a conventional transversal equalizer 251 and a tap adjusting circuit 253. The principle function of the transversal equalizer 251 is to equalize (compensate for) the linear distortion of the transmission channel 34 (FIG. 1). The transversal equalizer 251 includes a delay circuit 255 responsive to samples received from the switch 39 during the second mode of operation for developing and applying N signal delay outputs, $X_n$, $X_{n-1}$, $X_{n-2}$ . . . $X_1$, to multipliers 257*a*, 257*b*, 257*c*, . . . 257*n*, respectively. In a digital implementation, the delay circuit 255 can be comprised of N shift registers (not shown) for developing the N signal delay outputs $X_n$, $X_{n-1}$, $X_{n-2}$ . . . $X_1$. Where an analog implementation is desired, the N shift registers can be replaced with a multiple tap delay line (not shown) having N taps. Also respectively applied to the multipliers 257*a*, 257*b*, 257*c* . . . 257*n* are tap gain settings or multiplier coefficients $g_1, g_2, g_3 \ldots g_n$, which were developed by the tap adjusting circuit 253 during the previous first mode of operation. The products from the multipliers 257*a*, 257*b*, 257*c* . . . 257*n* are summed in a summation or combining circuit 259 to develop and apply an equalized signal output $Y_n$ to the data reformatter 47.

The tap gain setting which are derived from the tap gains from the tap gain generator 43, are developed by the tap adjusting circuit 253 in the following manner. During the second mode of operation, the 0 state mode signal from the control circuit 41 is inverted by a NAND gate 261 and used to reset a counter 263 to a zero count. During the subsequent first mode of operation, the 1 state mode signal prevents the NAND gate 261 from resetting the counter 263, and also allows an AND gate 265 to pass timing pulses from the timing recovery circuit 37 to the counter 263 to be counted. The multibit digital count of the counter 263 is applied to each of AND gates 267*a*, 267*b*, 267*c* . . . 267*n*, which have their inputs selectively inverted such that they respectively produce 1 state outputs when the count of the counter 263 goes to 1, 2, 3 . . . *n*. For example, the AND gate 267*a* inverts all of the bits applied thereto from the counter 263, except the least significant bit, while the AND gate 267*n* does not invert any of the output bits of the counter 263. The outputs of the AND gates 267*a*, 267*b*, 267*c* . . . 267*n* are respectively applied as enabling signals to gates 269*a*, 269*b*, 269*c* . . . 269*n*. Also applied to each of the gates 269*a*, 269*b*, 269*c* . . . 269*n* are the tap gains from the tap gain generator 43. The counter 263 and AND gate 267*a*, 267*b*, 267*c* . . . 267*n* operate as a function of the count of the counter 263 to selectively enable the gates 269*a*, 269*b*, 269*c* . . . 269*n* to respectively apply the tap gains to multirank, one-bit shift registers 271*a*, 271*b*, 271*c* . . . 271*n* for storage therein. Since the tap gains are being sequentially developed by the tap gain generator 43 at the same rate that the counter 263 is counting, each of the tap gains will be stored in an associated one of the shift registers 271*a*, 271*b*, 271*c* . . . 271*n*. The outputs of the shift registers 271*a*, 271*b*, 271*c* . . . 271*n* are the tap gain settings $g_1, g_2, g_3 \ldots g_n$, which are respectively utilized by the multipliers 257*a*, 257*b*, 257*c* . . . 257*n* in the transversal equalizer 251 during the second mode of operation to develop the products which are summed in the summation circuit 259 to develop the equalized signal output $Y_n$.

In the transversal equalizer 251, let $Z^{-1}$ represent a unit delay, or delay between adjacent ones of the delay outputs $X_n, X_{n-1}, X_{n-2} \ldots X_1$. As specified previously, the signals $g_1, g_2, g_3 \ldots g_n$ are the multiplier coefficients or tap gain settings. The transfer function G(Z) of the transversal equalizer 251, written in Z-transform, is $$G(Z^{-1}) = \sum_{n=1}^{N} g_n Z^{-n}$$

and its frequency response is simply $$G(e^{-JwT}) = \sum_{n=1}^{N} g(nT)e^{-JkwnT}$$

where $T$ is the time interval between samples and $Z^{-1} = e^{-JwT}$. The term $G(e^{-JwT})$ will henceforth be designated as $G_z(w)$.

Let the output of the transversal equalizer 251 be represented by $l(nT)$ and the inpulse response (FIG. 3*b*) of the transmission channel 34 be represented by $h(nT)$. It is from the impulse response ($h(nT)$ that the samples shown in FIG. 3C are derived. Also, let the tap gain settings or *g's* (*FIG. 3d*), which are samples of the time function $g(t)$, be represented by $g(nT)$, where $n$ is any integer between 1 and $N$ and $N$ is the total number of samples. Then the discrete Fourier transforms of the impulse response $h(nT)$, the tap gain settings $g(nT)$ and the output $lnT$) are respectively $Hz(k\Delta w)$, $Gz(k\Delta w)$ and $Lz(k\Delta w)$, where $k \times$ some integer between $h$ and $N$ and $\Delta w$ = the frequency interval under consideration. If the transversal equalizer 251 completely equalizes (compensates for) the distortion in the aforesaid transmission channel 34, then $Lz(k\Delta w)$ is a constant unity function and, as a result, $Gz(k\Delta w)$ is the reciprocal of $Hz(k\Delta w)$; i.e., $Gz(k\Delta w) = [1/Hz(k\Delta w)]$. This relationship produces the desired channel characteristic, namely, a flat frequency response over the operational frequency range of the transmission channel.

The basic problem associated with any transversal equalizer is to find the tap gains to enable the transversal equalizer to equalize the distortion in the transmission channel. A novel implementation for deriving the tap gains will now be discussed by referring to FIGS. 7, 8*a* and 8*b*.

Figure 7:
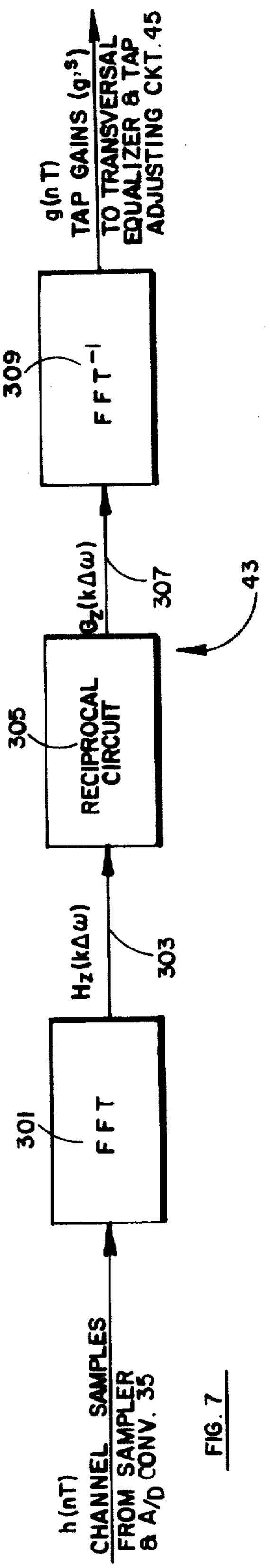
FIG. 7 is a block diagram of the tap gain generator 43 of FIG. 1.
Figure 8A:
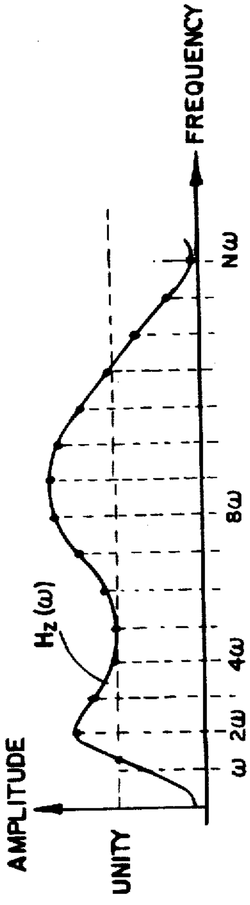
FIGS. 8*a* and 8*b* are waveforms useful in explaining the operation of the tap gain generator 43 of FIG. 7.
Figure 8B:
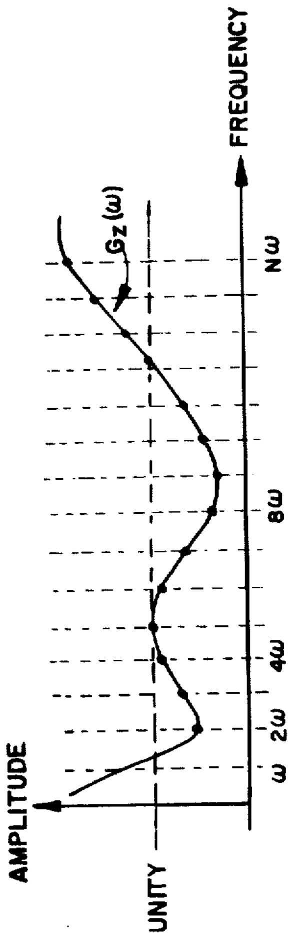

FIG. 7 illustrates in block diagram form the tap gain generator 43 of FIG. 1. The channel samples $h(nT)$ from the circuit 35 are applied to a fast Fourier transform circuit 301, which performs the discrete Fourier transform to change the time-domain samples $h(nT)$ into samples in the frequency domain. These frequency domain samples are samples of the transfer function $Hz(w)$, as shown in FIG. 8*a*, and can be designated as $Hz(k\Delta w)$, where $k$ is the index used in the frequency domain and is equal to some integer between 1 and $N$ and $\Delta w$ is an increment of frequency. These frequency domain samples $Hz(k\Delta w)$ are applied through a composite line 303 to a reciprocal circuit 305 to obtain the reciprocal values of these samples, which are samples of the transfer function $Gz(w)$, as shown in FIG. 8*b*, and can be designated as $[1/Hz(k\Delta w)]$ or $Gz(k\Delta w)$. The reciprocal values $Gz(k\Delta w)$ of the frequency domain samples $Hz(k\Delta w)$ are the frequency domain samples of the desired tap gains $g(nT)$. However, this presents the problem of finding the valves of $Gz(k\Delta w)$. The values of the samples $Gz(k\Delta w)$ can be determined by applying them by way of a composite line 307 to an inverse fast Fourier transform ($FFT^{-1}$) device 309. The $FFT^{-1}$ device 309 performs the inverse discrete Fourier transform (IDFT) of the frequency domain samples $Gz(k\Delta w)$ to change them into samples in the time domain. The IDFT of $Gz(k\Delta w)$ by the $FFT^{-1}$ device 309 produces the following relationships:

$$g(nT) = IDFT\left(\frac{1}{Hz(k\Delta w)}\right) = \sum_{k=1}^{N} \frac{1}{Hz(k\Delta w)} \cdot e^{+J\frac{2\pi kn}{N}},$$

where:
- $k$ = *any integer between* 1 and $N$,
- $\Delta w$ = an increment of frequency,
- $N$ = the largest value of $k$ or the total number of samples
- $N$ = any integer between 1 and $N$,
- $T$ = the time interval between samples, and $g(nT)$ = the IDFT of $Gz(k\Delta w)$.

These time domain samples are samples of the time function $g(t)$ and are the tap gains $g(nT)$ which are subsequently utilized by the transversal equalizer 251 (FIG. 6) to equalize the distortion in the transmission channel 34. As stated previously, the frequency response of the transversal equalizer 251 (FIG. 6) is:

$$\sum_{n=1}^{N} g(nT) \ e^{-jkwnT}$$

Consequently, the term $g(nT)$, which represents the tap gains, is the determining factor in the frequency response. If it changes, the frequency response of the transversal equalizer will change. The tap gain generator 43 is, therefore, readily responsive to the channel samples ($h(nT)$ for developing the tap gains $g(nT)$ shown in FIG. 3*d* to enable the transversal equalizer 251 to change its frequency response to equalize the distortion in the transmission channel.

The FFT and $FFT^{-1}$ devices 301 and 309 are conventional state-of-the-art devices which are illustrated in FIGS. 1 and 2 of U.S. Pat. No. 3,679,882. In addition, U.S. Pat. No. 3,721,812 illustrates a fast Fourier transform device which may be readily modified for use in the tap gain generator 43 of FIG. 7. The reciprocal circuit 305 will now be described in more detail by referring to FIG. 9.

Figures 9, 10:
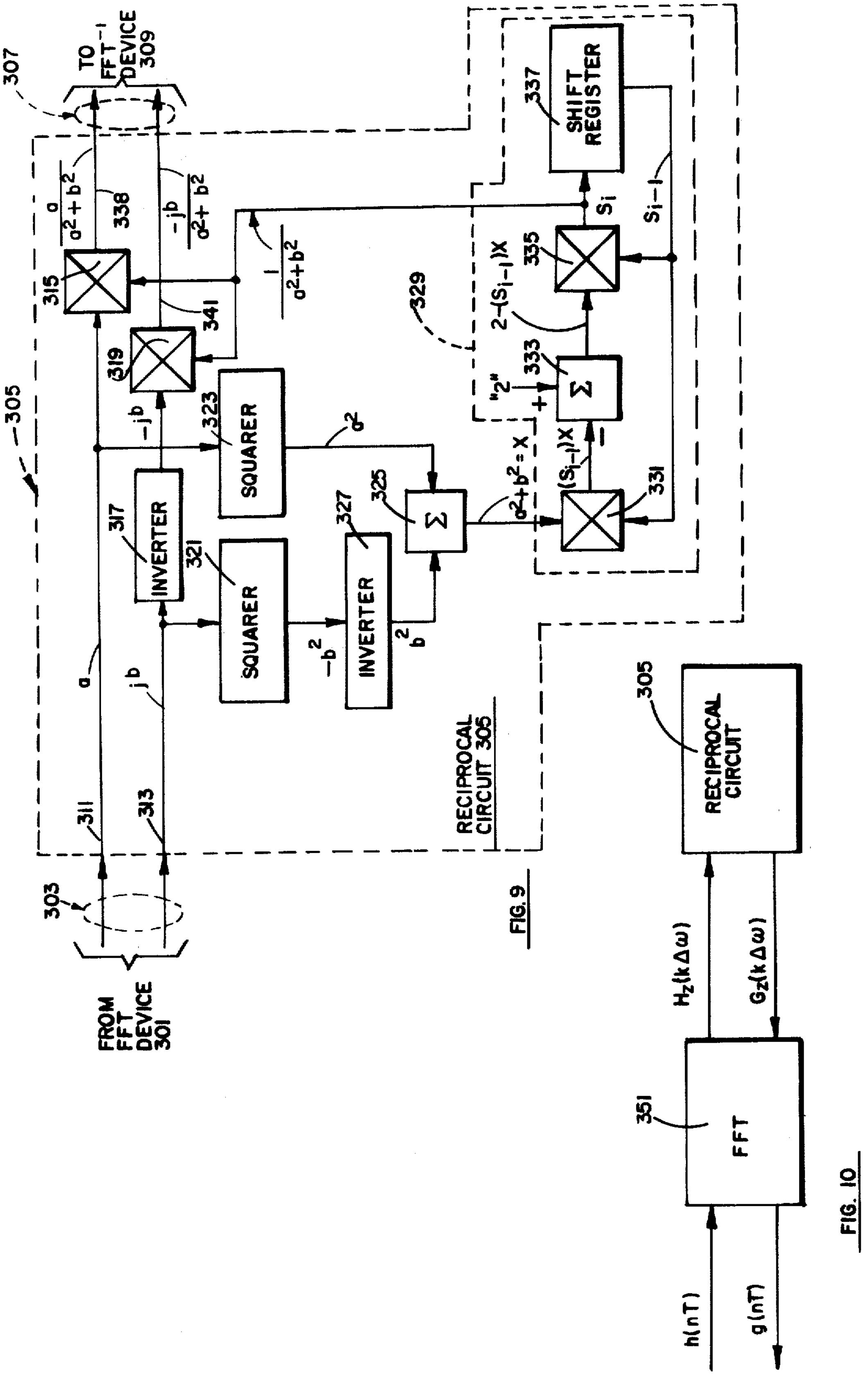
FIG. 9 is a block diagram of the reciprocal circuit of FIG. 7.
FIG. 10 is a block diagram of a modification of the tap gain generator illustrated in FIG. 7.

In FIG. 9, the composite line 303 from the FFT device 301 is composed of lines 311 and 313 since each of the samples $Hz(k\Delta w)$ consists of a complex number, which may be represented as "$a + jb$." The "$a$" part of the complex number is the real part of the number and is applied through the line 311 to a multiplier 315. The "$jb$" portion of the complex number is the imaginary part of the number and is applied along the line 313 through an inverter 317 to a multiplier 319. The "$jb$" input on the line 313 and the "$a$" input on the line 311 are respectively applied to squarer circuits 321 and 323. The $a^2$ output of the squarer 323 is directly applied to a summation circuit 325, while the $-b^2$ output of the squarer 321 is inverter by an inverter 327 before being applied to the summation circuit 325. The summation circuit 325 develops an output equal to $a^2 + b^2$. The next problem is to calculate the reciprocal of this $a^2 + b^2$ output. Let $X = a^2 + b^2$. The reciprocal of $X$, namely $1/X$, is developed by a circuit 329 in the following manner.

The $X$ quantity from the summation circuit 325 is applied to a multiplier 331 in the circuit 329. Also applied to the multiplier 331 is the quantity $S_I$ which will be defined later. The output of the multiplier circuit 331 is the product $X \cdot S_{i-1}$ which is applied to a combining or subtraction circuit 333. The combining circuit 333 also receives a constant quantity of 2. The combining circuit 33 basically substracts the product $X \cdot S_{i-1}$ from the quantity 2 and applies the resultant difference of $2-X \cdot S_{i-1}$ to a multiplier circuit 335. A second input to the multiplier circuit 335 is the $S_{i-1}$ quantity that was also applied to the multiplier 331. The output of the multiplier 335 will be designated as $S_i$ and is delayed one bit time by a shift register 337. The delayed output of the shift register 337 is the $S_{i-1}$ quantity which was applied to the multipliers 331 and 335. The $S_i$ output of the multiplier 335 will eventually be equal to the quantity $1/a^2 + b^2$ as it continually circulates in a sequential manner through the circuits 337, 331, 333 and 335 in the circuit 329. In addition, the output from the multiplier 335 can be represented by the equation $$S_i = S_{i-1}(2-X \cdot S_{i-1})$$

It will now be shown that the quantity $S_i$ will indeed become equal to $1/x$, which equals $1/a^2 + b^2$.

It was stated above that $$S_i = S_{i-1}(2-X \cdot S_{i-1}).$$

Removing the parenthesis and transposing terms, the equation now becomes $$S_i = 2S_{i-1}-X(S_{i-1})^2.$$

Transposing the term $-X(S_{i-1})^2$ to the left-hand side of the equation and the term $S_i$ to the right-hand side of the equation, the equation now becomes $$X(S_{i-1})^2 = 2S_{i-1}-S_i.$$

By dividing both sides of the equation by $(S_{i-1})^2$ and then inverting both sides of the equation, the equation then becomes $$[(S_{i-1})^2/2S_{i-1}=S_i]=(1/X).$$

When $i$ $\infty$ :

$$(S_\infty \cdot S_\infty)/(2S_\infty - S_\infty) = 1/X.$$

By performing the indicated operations of subtraction and division, the equation now becomes $$S_\infty = (1/X).$$

It has therefore been shown that when $i$ approaches $\infty$ the quantity $S_i$ approaches $(1/X)$. Since $X$ was stated to be equal to $a^2 + b^2$, $1/X$ is equal to $(1/a^2 + b^2)$.

The quantity $(1/a^2 + b^2)$ is applied to both the multiplier circuits 315 and 319. It will be recalled that the quantity $a$ was applied to the multiplier 315 and the quantity $-jb$ was applied to the multiplier 319. As a result, the multipliers will develop outputs on lines 339 and 341 which will respectively be $(a/a^2 + b^2)$ and $(-jb/a^2 + b^2)$. The two outputs from the multipliers 315 and 319 form a complex number $(a-jb/a^2 + b^2)$, which has an identity equal to $1/a + jb$. It has therefore been shown that the reciprocal circuit 305 will develop an output which is the reciprocal of its input. It should also be noted that the output lines 339 and 341 function together as the composite line 307 which is applied to the $FFT^{-1}$ device 309.

A modification of the tap gain generator 43 is shown in FIG. 10. The tap gain generator of FIG. 10 includes a single FFT device 351 coupled to the reciprocal circuit 305. The channel samples $h(nT)$ are applied to the FFT 351 to develop the output $Hz(k\Delta w)$ in the frequency domain. This $Hz(k\Delta w)$ output is applied to the reciprocal circuit 305 which develops and applies its reciprocal output $Gz(k\Delta w)$ back to the FFT device 351. In response to the $Gz(k\Delta w)$ output from the reciprocal circuit 305, the FFT device 351 performs the inverse discrete fast Fourier transform to develop the tap gains $g(nT)$ as discussed previously. The FFT device 351, which performs the same functions that the devices 301 and 309 of FIG. 7 perform, may be implemented from the FFT device shown in U.S. Pat. No. 3,721,812. It should, however, be understood that the operations are sequential in nature. That is, when the FFT 351 is performing the discrete fast Fourier transform to develop the $Hz(k\Delta w)$ output, it is not performing an inverse discrete fast Fourier transform to develop the $g(nT)$ tap gains, and vice versa.

The invention thus provides a system wherein samples of an input signal in the time domain are transformed by a fast Fourier transform device into samples in the frequency domain. Reciprocal values of these frequency domain samples are then derived by a reciprocal circuit for subsequent transformation by an inverse fast Fourier transform device into time domain samples which are the tap gains utilized by a transversal equalizer to develop equalized signals.

While the salient features have been illustrated and described, it should be readily apparent to those skilled in the art that modifications can be made within the spirit and scope of the invention as set forth in the appended claims.

I claim:

1. An equalization system for automatically adjusting the tap settings of a transversal equalizer to correct for distortions of a data signal received from a transmission channel, said system comprising:

first means responsive to a first signal in the time domain from the transmission channel for developing time domain samples of the first signal;

second means for performing a discrete fast Fourier transform on the time domain samples of the first signal to develop samples in the frequency domain;

third means for developing reciprocal values of the samples in the frequency domain; and fourth means for performing an inverse discrete fast Fourier transform on said reciprocal values of the samples in the frequency domain to develop time domain tap gains for automatically adjusting the tap settings in the transversal equalizer circuit 2. The system of claim 1 wherein said first means includes:

means for selectively sampling said first signal and said data signal received from the transmission channel to develop samples thereof in the time domain;

means coupled to the transmission channel for generating a first control signal when the first signal is being received from the transmission channel and for generating a second control signal when the data signal is being received from the transmission channel;

fifth means having first and second outputs for allowing samples of the first signal to be passed to said first output in response to the first control signal and for allowing samples of the data signal to be passed to said second output in response to the second control signal.

3. The system of claim 1 wherein:

said second means is a fast Fourier transform device; and said fourth means is an inverse fast Fourier transform device.

4. The system of claim 3 wherein said first means includes:

means for selectively sampling said first signal and said data signal received from the transmission channel to develop samples thereof in the time domain;

means coupled to the transmission channel for generating a first control signal when the first signal is being received from the transmission channel and for generating a second control signal when the data signal is being received from the transmission channel; and fifth means having first and second outputs for allowing samples of the first signal to be passed to said first output in response to the first control signal and for allowing samples of the data signal to be passed to said second output in response to the second control signal.

5. The system of claim 4 further including:

a first source for generating the first signal:

a second source for generating the data signal; and means coupled to said first and second sources for selectively transmitting the first signal and data signal into the transmission channel.

6. The system of claim 5 wherein said transmitting means includes:

sixth means coupled to said first and second sources for selectively permitting the first signal and the data signal to be transmitted into the transmission channel; and seventh means for controlling said sixth means to pass the first signal to the transmission channel during a first mode of operation and for controlling said sixth means to pass the data signal to the transmission channel during a second mode of operation.

7. A system for adjusting the tap settings in a transversal equalizer circuit adapted to be responsive to a transmission channel, said system comprising:

a first signal source for generating test pulse signals;

a second signal source for generating digital data signals;

first means for applying test pulse signals to the transmission channel during a first mode of operation and for applying the digital data signals to the transmission channel during a second mode of operation;

second means being responsive to the signals received from the transmission channel for developing samples of the test pulse signals during the first mode of operation and for developing and applying samples of the digital data signals to the transversal equalizer circuit during the second mode of operation:

third means for performing a discrete fast Fourier transform on the samples of the test pulse signals to develop samples in the frequency domain;

fourth means for developing reciprocal values of the samples in the frequency domain; and fifth means for performing an inverse discrete fast Fourier transform on the reciprocal values of the samples in the frequency domain to develop time domain tap gains for automatically adjusting the tap settings in the transversal equalizer.

8. A system adapted to equalize data signals transmitted through a transmission channel of limited bandwidth, said system comprising:

a first source for generating first signals;

a second source for generating data signals;

a first switching circuit being responsive to first and second states of a first control signal for selectively controlling the passage of the first signals and data signals therethrough to the transmission channel;

a first control circuit for generating and applying the first control signal to said first switching circuit, said first switching circuit being responsive to the first and second states of the first control signal for respectively passing the first and data signals to the transmission channel;

means being responsive to signals from the transmission channel for providing samples thereof;

a second control circuit coupled to the transmission channel for generating a first state second control signal when first signals are being passed through the transmission channel and for generating a second state second control signal when data signals are being passed through the transmission channel;

a second switching circuit having first and second output terminals, said second switching circuit being responsive to the second control signal for applying samples of the first signals to said first output terminal when the second control signal is in the first state and for applying samples of the data signals to said second output terminal when the second control signal is in the second state;

a transversal equalizer circuit having a plurally tapped delay circuit coupled to said second switching circuit, a plurality of adjustable tap gains coupled to respective taps of said tapped delay circuit, and a summation circuit coupled to said adjustable tap gains, said transversal equalizer circuit being responsive to the application of samples of the data signals from said second switching circuit to said delay circuit for providing output equalized data signals as a function of the adjustment of said adjustable tap gains;

transformation means being responsive to the samples of the first signals from said first output terminal for transforming same from a time domain to a frequency domain, and a reciprocal circuit being responsive to the frequency domain samples of the first signals for developing and applying reciprocal values of the frequency domain samples to said transformation means, said transformation means being responsive to the reciprocal values of the frequency domain samples for transforming same into time domain tap gain signals to adjust said adjustable tap gains in said transversal equalizer circuit.

9. The system of claim 8 wherein said transformation means is a fast Fourier transform device for performing a discrete fast Fourier transform on the samples of the first signals and for performing an inverse discrete fast Fourier transform on the reciprocal values of the frequency domain samples from said reciprocal circuit.

10. The system of claim 8 wherein said transformation means includes:

a fast Fourier transform device for performing a discrete fast Fourier transform on the samples of the first signals to transform them into frequency domain samples of the first signals; and an inverse fast Fourier transform device for performing an inverse discrete fast Fourier transform on the reciprocal values of the frequency domain samples from said reciprocal circuit to transform them into the time domain tap gain signals.

11. An equalization system for automatically adjusting the tap settings of a transversal equalizer to correct for distortions of a data signal received from a transmission channel, said system comprising:

sampling means responsive to a first signal in the time domain from the transmission channel for developing time domain samples of the first signal;

a transformation device responsive to the time domain samples of the first signal for performing a discrete fast Fourier transform thereon to transform them into frequency domain samples of the first signal; and a reciprocal circuit responsive to the frequency domain samples of the first signal for developing and applying reciprocal values of the frequency domain samples to said transformation device, said transformation device being responsive to the reciprocal values of the frequency domain samples for performing an inverse discrete fast Fourier transform thereon to transform them into time domain tap gain signals to adjust the tap settings in the transversal equalizer.

* * * * *